UNITED STATES PATENT OFFICE.

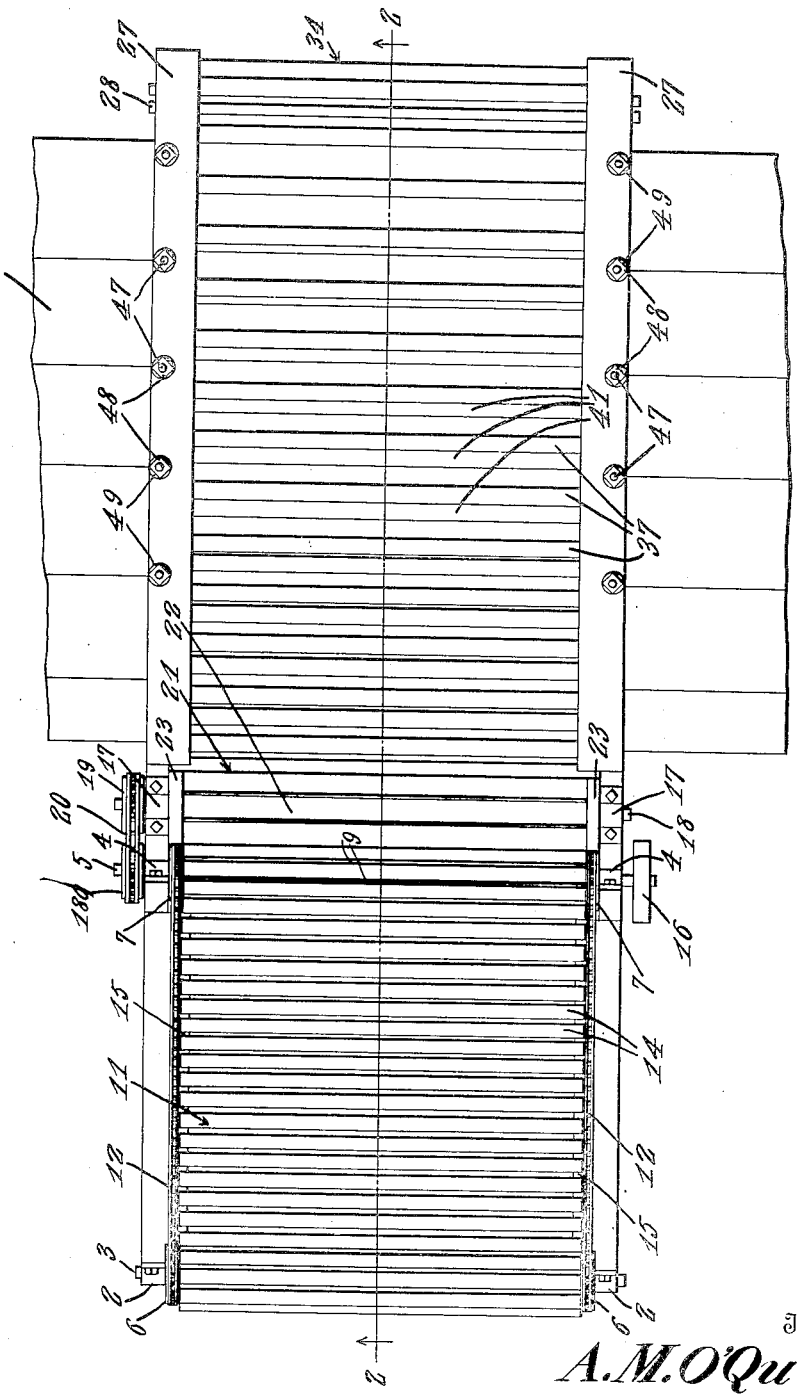

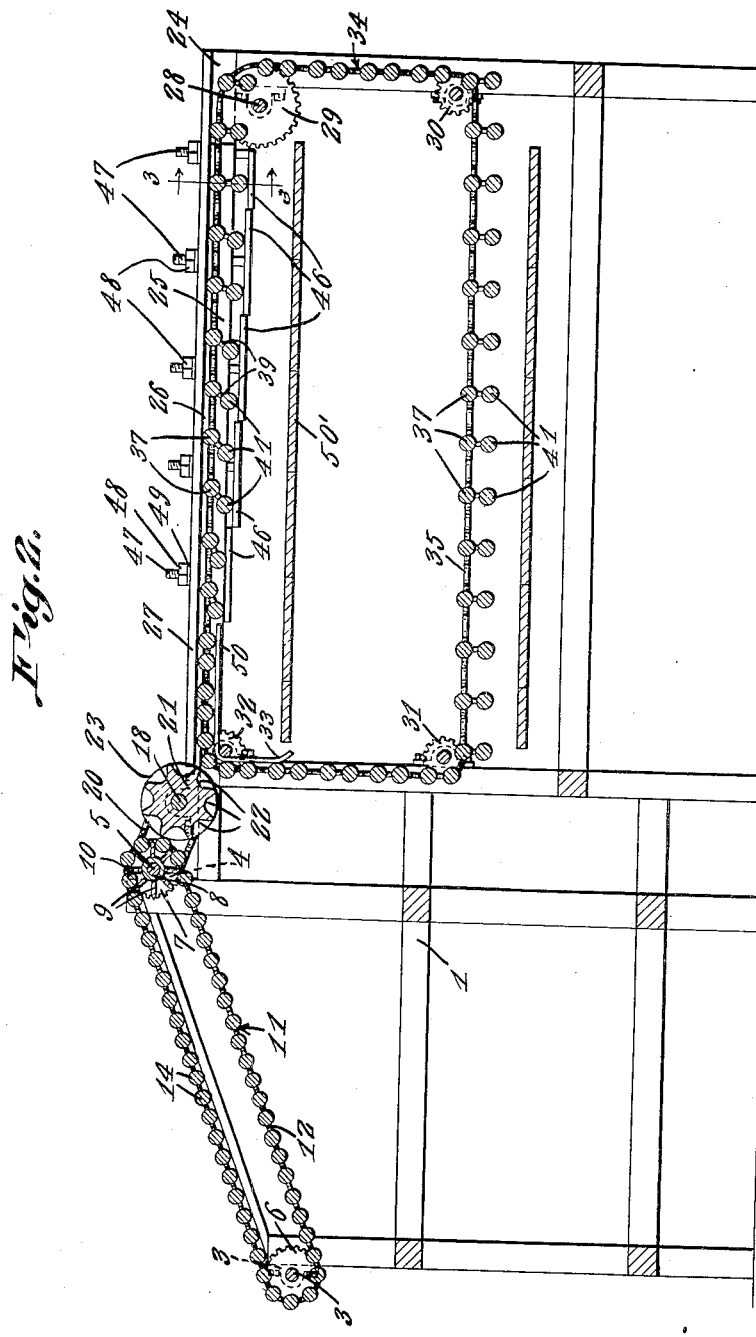

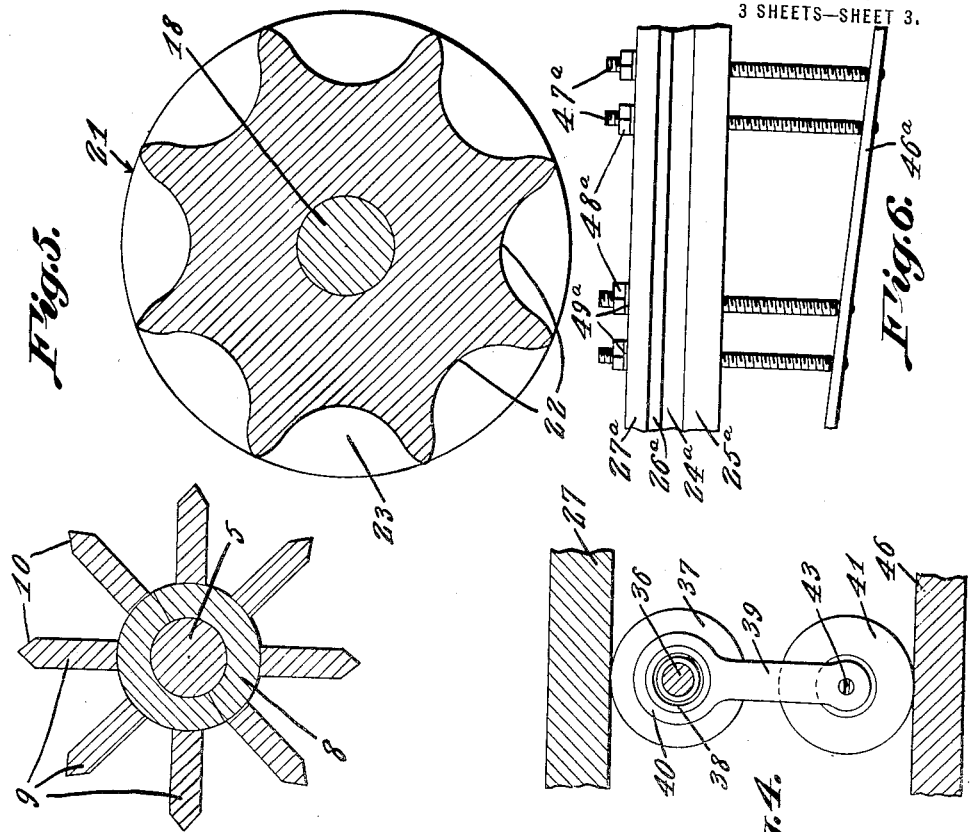
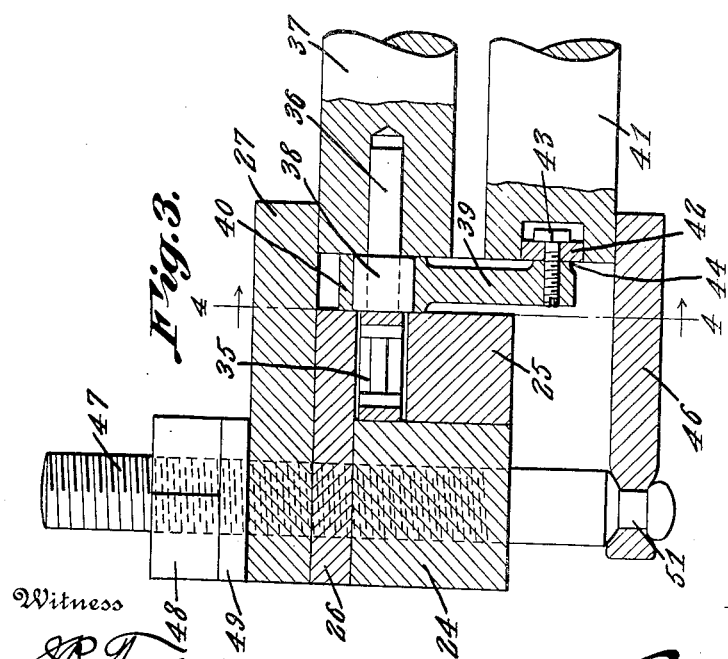
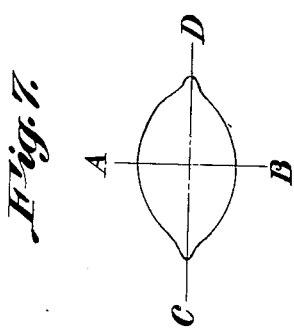

ARTHUR MORELAND O'QUINN, OF MIAMI, FLORIDA.

SIZER AND GRADER.

1,337,257.    Specification of Letters Patent.    Patented Apr. 20, 1920.

Application filed November 17, 1919. Serial No. 338,440

*To all whom it may concern:*

Be it known that I, ARTHUR M. O'QUINN, a citizen of the United States, residing at Miami, in the county of Dade and State of Florida, have invented a new and useful Sizer and Grader, of which the following is a specification.

The device forming the subject matter of this application is a sizer and grader, and one object of the invention is to provide means whereby the material may be graded according to size when the material is not of spherical form, lemons, tomatoes, apples and the like falling under this head.

Another object of the invention is to provide a means whereby a cheek-to-cheek sizing will be brought about, combined with a positive feed during the sizing operation.

Another object of the invention is to provide a novel ejector mechanism which prevents the fruit from being jammed or bruised.

A further object of the invention is to provide a novel feeding and delivery member, so constructed that the fruit will not be permitted to drop and become bruised.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in top plan, a device constructed in accordance with the invention; Fig. 2 is a vertical section on the line 2—2 of Fig. 1; Fig. 3 is a fragmental section on the line 3—3 of Fig. 2; Fig. 4 is a section on the line 4—4 of Fig. 3; Fig. 5 is a sectional view, showing the relation existing between the ejecting and the rotary receiving and delivering member; Fig. 6 is a fragmental elevation showing a slight modification in the invention; Fig. 7 is a diagrammatic view showing one form of fruit adapted to be sized by the machine.

In carrying out the invention there is provided a supporting frame 1 which need not be described in detail, since it may be formed in various ways without jeopardizing the utility of the invention. Parts of the frame which have specific functions, will be alluded to hereinafter. The frame 1 carries, at one end, bearings 2 in which a shaft 3 is journaled. Bearings 4 are mounted on the frame 1, inwardly of the bearings 2, a shaft 5 being journaled in the bearings 4. There are sprocket wheels 6 on the shaft 3, sprocket wheels 7 being carried by the shaft 5. The shaft 5 is provided with an ejector, including a bushing 8 from which projects ribs 9, the same being beveled at their outer edges, as shown at 10.

A first conveyer 11 is provided, the said conveyer including chains 12 coöperating with the sprocket wheels 6 of the shaft 3 and with the sprocket wheels 7 of the shaft 5, the chains 12 being connected by rollers 14. The rollers 14 travel at their ends along parts 15 of the frame 1. The shaft 5 is supplied with a driving means 16 of any desired sort.

The frame 1 carries bearings 17 wherein is journaled a shaft 18 provided with a sprocket wheel 19. There is a sprocket wheel 180 on the shaft 5, the sprocket wheels 180 and 19 being connected by a chain 20. The numeral 21 designates a rotary receiving and delivery member secured to the shaft 18 to rotate therewith. The member 21 is provided with concaved longitudinal grooves 22. There are as many of these grooves as there are ribs 9 in the ejector. The rotary receiving and delivery member 21 is provided with end portions 23 which prevents the fruit from moving longitudinally of the delivery member and dropping out of the delivery member at its ends.

The frame 1 includes guide rails 24, to the inner sides of which chain tracks 25 are secured. Retaining strips 26 are secured to the rails 24 and overhang the chain tracks 25. Top strips 27 are superimposed on the strips 26 and project beyond the inner edges of said strips, as shown in Fig. 3.

A drive shaft 28 is journaled in the frame 1 and carries sprocket wheels 29. Idle sprocket wheels 30 are journaled on the frame 1 below the sprocket wheels 29, sprocket wheels 32 being mounted on the frame 1 adjacent to the shaft 18. Sprocket wheels 31 are mounted on the frame, below the sprocket wheels 32. Angular guides 33 are carried by the guide rails 24 and include horizontal portions or supports 50 disposed adjacent to the sprocket wheels 32. The invention comprises a second conveyer 34 made up of links 35, the links being adapted to traverse the chain tracks 25 in edge engagement with the guide rails 24, the strips 26 extending above the said links. The links 35 of the second conveyer 34 are connected pivotally by pins 36, the inner ends of which support main rollers 37, the pins 36 carrying anti-friction bearings 38 on which are suspended hangers 39 provided with eyes 40 receiving the anti-friction bearings. Auxiliary rollers 41 are supplied, the same carrying bearings 42 attached by securing elements 43, which may be screw bolts, to the lower ends of the hangers 39. The lower ends of the hangers 39 have bosses 44, coöperating with the bearings 42 to space the ends of the rollers 41 from the hangers.

Supports 46 are located below the guide rails 24 and the chain tracks 25, and along these supports, the rollers 41 of the upper run of the conveyer 34 are adapted to move. The supports 46 may be raised and lowered, for adjustment, by any suitable means, such as through the instrumentality of adjusting screws 47 slidable in the parts 24, 26 and 27, and connected rotatably, as shown at 51, with the supports 46. The screws 47 and, consequently, the supports 46 may be adjusted vertically by means of nuts 48 and washers 49 on the upper end of the screws, these parts coacting with the top strips 27. As shown in Fig. 2 of the drawings, the supports 46 are disposed in vertically stepped relation. However, as disclosed in Fig. 6, they may be disposed in alinement, but on an incline. In Fig. 6, parts hereinbefore described have been designated by numerals previously used, with the suffix "a".

In practical operation, the fruit is carried upwardly by the conveyer 11. If fruit of small diameter should happen to be wedged between the rollers 14 of the said conveyer, this fruit will be dislodged by the ribs 9 of the ejector. The parts shown in Fig. 5 of the drawings are so synchronized that the ribs 9 will eject the fruit into the grooves 22 of the rotary receiving and delivery member 21. The fruit passes upon the second conveyer 34 and it is to be observed that, first, the fruit is received by those rollers 37 and 41 which are supported, in horizontal alinement, upon the parts 50 of the guides 33. Here, the smallest size of fruit is selected or graded out. As the second conveyer 34 moves along, the auxiliary rollers 41 swing downwardly upon the members 46, one after another, the space between the auxiliary roller 41 of one set, and the main roller 37 of an adjoining set being increased progressively. Consequently, the fruit will be graded according to size. The graded fruit is carried away by any suitable means indicated at 50.

It is to be observed that the delivery member 21 passes the fruit upon the second conveyer 34 without dropping or bruising the fruit. The fruit is graded for size and there may be any desired number of the supports 46, depending upon the number of sizes into which the fruit is graded. The speed of the conveyer 34 is so regulated that the rotary member 21 will discharge between the relatively fixed roller 37 of one set, and the vertically adjustable roller 41 of an adjoining set. It will be observed that the top strips 27 engage the main rollers 37 of the conveyer 34 and rotate them counter clockwise. The members 46 rotate the auxiliary rollers 41 clockwise. Consequently, there will be no pinching or crushing of the fruit when the same is graded between the roller 37 of one set and the roller 41 of an adjoining set. The construction of the device is such that it effects a cheek to cheek sizing, that is, a sizing on the axis A—B of Fig. 7, as distinguished from a sizing on the axis C—D of the said figure.

Having thus described the invention, what is claimed is:—

1. In a device of the class described, a conveyer embodying spaced grading elements and movable grading elements mounted to swing in arcs and coöperating with the spaced grading elements to define grading openings; and means for progressively lowering the movable grading elements to vary the size of the said grading openings.

2. In a device of the class described, a conveyer embodying rotatable grading elements and movable grading elements mounted to swing in arcs and coöperating with the rotatable grading elements; means for progressively lowering the movable grading elements; and a fixed member wherewith the rotatable elements coöperate to impart rotation thereto.

3. In a device of the class described, a conveyer embodying spaced grading elements and movable grading elements coöperating with the spaced grading elements, the movable grading elements being mounted to swing in arcs and to rotate on their axes; and means for progressively lowering the movable grading elements to vary the distance between the spaced and movable grading elements, the movable grading elements coöperating with said means thereby to impart rotation to the movable grading elements.

4. In a device of the class described, a conveyer embodying spaced rotatable grading elements and movable grading elements coöperating with the spaced grading elements, the movable grading elements being mounted to swing in arcs and to rotate on their axes; a fixed member wherewith the spaced grading elements coact to impart rotation thereto; and means for progressively lowering the movable grading elements to vary the distance between the spaced and movable grading elements, said means coacting with the movable elements to impart rotation thereto.

5. In a device of the class described, a conveyer comprising main grading elements having straight line advancing movement with the conveyer and auxiliary grading elements having advancing movement with the conveyer and radial swinging movement on the conveyer toward and away from the main grading elements to define grading openings; and means coöperating with the auxiliary grading elements to vary the size of the said grading openings.

6. In a device of the class described, a conveyer comprising main and auxiliary grading elements disposed in pairs, the auxiliary grading element of each pair being suspended on the conveyer for radial swinging movement toward and away from the main grading element of an adjoining pair; and means for adjusting the auxiliary grading elements with respect to the main grading elements.

7. In a device of the class described, a conveyer comprising rotatable main grading elements having straight line advancing movement with the conveyer, and rotatable auxiliary grading elements suspended from the conveyer for swinging movement toward and away from the main grading elements; and separate means for rotating the main and auxiliary grading elements, one of said means constituting mechanism for progressively spacing the auxiliary grading elements from the main grading elements.

8. In a device of the class described, a conveyer comprising rotatable main grading elements having straight line advancing movement with the conveyer, and rotatable auxiliary grading elements suspended from the conveyer for swinging movement toward and away from the main grading elements; and separate means for rotating the main and auxiliary grading elements in opposite directions one of said means constituting mechanism for progressively spacing the auxiliary grading elements from the main grading elements.

9. In a device of the class described, a conveyer comprising main rollers and auxiliary rollers disposed in pairs, the main rollers being spaced along the conveyer, and the auxiliary rollers being suspended from the conveyer for radial swinging movement with respect to the main rollers, the auxiliary roller of one pair coöperating with the main roller of adjoining pair to effect a sizing of the material; means for rotating the main rollers in one direction and means for rotating the auxiliary rollers in an opposite direction, whereby the auxiliary roller of one pair and the main roller of an adjoining pair will effect a cheek to cheek sizing, and whereby the main roller of said one pair will effect a positive feed of the material.

In testimony that I claim the foregoing as my own, I have hereto affixed my signature in the presence of two witnesses.

ARTHUR MORELAND O'QUINN.

Witnesses:
K. B. O'QUINN,
C. C. SMITH.